United States Patent
Kingsford et al.

[11] Patent Number: 6,000,416
[45] Date of Patent: Dec. 14, 1999

[54] COMPACT VALVE WITH ROLLING DIAPHRAGM POPPET

[75] Inventors: Kenji A. Kingsford, Devore; Anthony K. T. Chan, San Gabriel; Mario Fregoso, Whittier; David R. Martinez, Corona, all of Calif.

[73] Assignee: Furon Company, Laguna Niguel, Calif.

[21] Appl. No.: 08/868,639

[22] Filed: Jun. 4, 1997

[51] Int. Cl.⁶ .............................. F16K 1/02; F16K 31/122
[52] U.S. Cl. .............................. 137/1; 137/312; 251/63.5; 251/121; 251/205; 251/335.2; 251/359
[58] Field of Search .................. 251/61.2, 61.3, 251/61.4, 61.5, 63.5, 63.6, 84, 120, 121, 205, 331, 335.2, 359, 368; 137/312, 1; 92/98 D

[56] References Cited

U.S. PATENT DOCUMENTS

| | | | |
|---|---|---|---|
| 2,726,843 | 12/1955 | Evans et al. | 251/359 |
| 3,151,838 | 10/1964 | Tripoli et al. | 251/267 |
| 3,198,479 | 8/1965 | Greenwood | 251/205 |
| 3,356,333 | 12/1967 | Scaramucci | 251/359 |
| 3,384,338 | 5/1968 | Dermody | 251/205 |
| 3,451,423 | 6/1969 | Priese | 137/556 |
| 3,666,230 | 5/1972 | Pauliukonis | 251/63.5 |
| 3,736,640 | 6/1973 | Freheit | 251/365 |
| 3,794,249 | 2/1974 | Lockwood | 251/205 |
| 3,838,707 | 10/1974 | Wachowitz, Jr. | 137/312 |
| 3,897,042 | 7/1975 | Kachergis | 251/84 |
| 4,203,464 | 5/1980 | Farrell et al. | 137/454.2 |
| 4,270,727 | 6/1981 | Norman | 251/63.4 |
| 4,413,647 | 11/1983 | DeLorenzo et al. | 137/312 |
| 4,634,099 | 1/1987 | Danko et al. | 251/214 |
| 4,687,017 | 8/1987 | Danko et al. | 251/63.5 |
| 4,720,076 | 1/1988 | Hyde | 251/335.2 |
| 4,819,691 | 4/1989 | Löfgren et al. | 137/556 |
| 4,826,132 | 5/1989 | Moldenhauer | 251/129.17 |
| 4,828,219 | 5/1989 | Ohmi et al. | 251/118 |
| 4,840,347 | 6/1989 | Ariizumi et al. | 251/63.6 |
| 4,872,638 | 10/1989 | Thompson et al. | 251/331 |
| 4,874,014 | 10/1989 | Grant et al. | 137/606 |
| 4,901,751 | 2/1990 | Story et al. | 137/312 |
| 5,002,086 | 3/1991 | Linder et al. | 137/312 |
| 5,004,011 | 4/1991 | Linder et al. | 137/556 |
| 5,029,813 | 7/1991 | Walton et al. | 251/335.2 |
| 5,178,366 | 1/1993 | Kojima et al. | 251/335.2 |
| 5,215,286 | 6/1993 | Kolenc | 251/58 |
| 5,261,442 | 11/1993 | Kingsford et al. | 137/312 |
| 5,549,134 | 8/1996 | Browne et al. | 137/606 |

FOREIGN PATENT DOCUMENTS

| | | |
|---|---|---|
| 085852 | 8/1983 | European Pat. Off. . |
| 611219 | 8/1994 | European Pat. Off. . |

*Primary Examiner*—George L. Walton
*Attorney, Agent, or Firm*—Christie, Parker & Hale, LLP

[57] ABSTRACT

A valve apparatus comprises a valve body, a piston disposed within the valve body, and a rolling diaphragm poppet that is attached the piston to regulates fluid flow through the valve via interaction with a valve seat within the valve body. The valve body has a chamber extending therethrough that includes a valve seat at one chamber end that defines a fluid inlet passage into chamber. The piston disposed within the chamber and is adapted for axial displacement therein by an actuating means. The rolling diaphragm poppet is attached to an end of the piston and is of a one-piece construction. The poppet includes a head that has a circular radial cross section, and that has a frontside surface that is adapted to interface with the valve seat in the chamber to control fluid flow therethrough. The head also has a backside surface that is adapted to accommodate attachment with an end of the piston. The poppet includes a cylindrical sleeve that extends axially away from a peripheral edge of the head and that has a non-bellowed configuration. A flange extends radially from the sleeve to define a peripheral edge of the poppet. The flange including means for providing a leak-tight seal with the valve body. Axial displacement of the poppet head within the chamber, in response to the axial movement of the piston, is provided by a rolling movement of the sleeve in an axial direction between a piston wall surface and a concentric wall surface within the valve body.

23 Claims, 6 Drawing Sheets

COMPACT VALVE WITH ROLLING DIAPHRAGM POPPET

FIELD OF THE INVENTION

This invention relates to fluid handling apparatus and poppets that can be used with corrosive liquids without valve component degradation and with chemically pure liquids without deleteriously affecting the liquids; and more specifically, to valve apparatus having a rolling diaphragm poppet that allows the valve to be sized more compactly than conventional poppet or diaphragm valve constructions having a similar poppet stroke length, and that are designed for transporting chemically aggressive and chemically pure liquids without degrading and deleteriously affecting the liquids.

BACKGROUND OF THE INVENTION

Fluid flow control valves are used in applications where the valve internals are subjected to corrosive acidic or caustic liquids, or where the purity of the liquids which flow through the valve must be maintained. An example of such application is the semi-conductor manufacturing industry where process chemicals distributed through a control valve must maintain a high degree of chemical purity to avoid contamination that may occur on the microscopic level. Such valves are either constructed of relatively inert materials, e.g., fluoropolymers or other polymeric materials, or the valve surfaces which come into contact with the flowing liquids, or which potentially can come into contact with the liquids, are coated with such inert materials.

Fluid flow control valves known in the art are commonly biased into the closed position by a spring force and are opened by means of a solenoid actuator, or actuator means operated by pneumatic or hydraulic pressure and the like. Valve closure springs typically used in such valves are made from a metallic material and configured to afford a resilient action. Such fluid control valves also include at least one diaphragm disposed within the valve chamber of the valve. The diaphragm is placed into contact with the liquid and serves to prevent the escape of the fluid from the valve chamber into the valve operating mechanism and into the environment. A valve stem is disposed axially within the chamber and the diaphragm is attached to an end of the valve stem, thereby forming a valve poppet assembly. The diaphragm includes a peripheral edge portion that is engaged against an adjacent wall portion of the valve body at each opposite end of the valve body.

The valve closure springs are typically placed adjacent a surface of the valve diaphragm that is not exposed to the process fluid distributed through the valve. The transfer of the process fluid through the valve is controlled by the actuation of the valve stem within the chamber against a valve seat. The movement of the valve stem is accommodated in part by the controlled deformation of the diaphragm. Control valves constructed in this manner are prone to failure due to both the possibility of eventual diaphragm rupture and to the large number of leak paths inherent in such construction. A valve constructed in this manner has two leak paths or potential passages through which fluid within the valve chamber can escape into the valve operating mechanism or the environment. One leak path is formed at the attachment point between the diaphragm and the end of the valve stem, and the other leak path is formed between the peripheral edge of each diaphragm and the valve body walls.

Diaphragm rupture or leakage though any one of the leak paths is not desirable because the process chemical directed through the valve chamber may be allowed to escape into the valve body where the corrosive or caustic chemical can come into contact with the valve spring, and thereby provide a source of ionic contamination to the process chemical to pass on to other downstream chemical processing units. Alternatively, diaphragm rupture or leakage may result in the escape of the process chemical from the valve chamber, through the valve body and onto the ground or into the atmosphere, where the particular process chemical may cause a hazard to the environment or a health danger to nearby operators.

The potential for diaphragm rupture or leakage limits the extent to which such valves can be used in high process pressure or high process temperature applications. The diaphragm used in such valves is designed to both permit a desired degree of elastic deformation to permit valve stem actuation and provide a barrier to prevent unwanted process fluid migration from the valve chamber into an actuating chamber of the valve. Although ultimate barrier performance of the diaphragm can be achieved by maximizing its thickness, a maximum diaphragm thickness is governed by the competing need to provide a diaphragm that is capable of elastically deforming a desired amount to ensure valve stem actuation. It is this need to keep the diaphragm deformable that also limits the temperature and pressure at which the valve can safely operate, it being understood that the maximum operating pressures and temperatures for the valve are related.

The construction of a fluid flow control valve having a poppet assembly constructed using such valve stem and diaphragm members impacts the size of the valve itself, as the stroke length of the valve stem is closely related to the diameter of the diaphragm. Generally speaking, the longer the desired valve stem stroke length, the larger the diameter of the diaphragm to enable such stroke length. Additionally, the size of a particular valve that is adapted to operate to a certain maximum pressure and temperature will depend, inter alia, on the size of the diaphragm that is needed to provide adequate deformation and barrier performance characteristics. Generally speaking, the more highly rated the valve, i.e., the higher the flow, the larger the valve itself due in part to the need to provide a diaphragm suitably sized to withstand such flow conditions.

In the handling of fluids where the space occupied by the fluid handling apparatus or valve apparatus in a fluid handling system is at a premium, it is desired that such valve apparatus be compact or small in size. In the handling of liquids where the chemical purity must be maintained, to ensure the desired degree of quality for the product manufactured using such process liquids, and the escape of process liquids into the environment is undesired, it is desired that the valve apparatus be made in a manner that both: (1) eliminates the possibility that contaminants may be introduced into the process caused by contact of the process liquid with elements of the valve during distribution therethrough; and (2) minimizes the possibility of process liquid escaping from the valve chamber into other portions of the valve or into the environment.

It is desirable that the valve apparatus be constructed having a compact size that is smaller than conventional diaphragm or poppet-type valves designed to operate at the same flow conditions. It is desirable that the valve apparatus be made from material having a high degree of chemical resistance and thermal resistance to resist degradation through contact with corrosive, or caustic chemicals and the like. It is desirable that the valve apparatus be constructed in a manner that results in the inherent reduction of leak paths, thereby minimizing the potential for chemical leakage into the environment. It is desirable that the valve apparatus be capable of operating at high temperatures and under high pressures without danger of valve failure or chemical leakage. It is also desirable that the valve apparatus be constructed using conventional manufacturing principles from available materials to reduce the cost of manufacturing such valve.

SUMMARY OF THE INVENTION

Fluid flow control apparatus, constructed according to principles of this invention, generally comprise a valve body, a piston disposed within the valve body, and a rolling diaphragm poppet that is attached to the piston and that regulates fluid flow through the valve via its interaction with a valve seat within the valve body. More specifically, the valve body can be formed from one or two-or-more stacked members having a central chamber extending therethrough. The chamber includes a valve seat at one end defining a fluid inlet passage into chamber. The piston disposed within the chamber and is adapted for axial displacement therein by an actuating means.

The rolling diaphragm poppet according to this invention is attached to an end of the piston and is of a one-piece construction. The poppet includes a head that has a circular radial cross section, and that has a frontside surface that is adapted to interface with the valve seat in the chamber to control fluid flow therethrough. The head also has a backside surface that is adapted to accommodate attachment with an end of the piston. The poppet includes a cylindrical sleeve that extends axially away from a peripheral edge of the head and that has a non-bellowed diameter. A flange extends radially from the sleeve to define a peripheral edge of the poppet. The flange includes means for providing a leak-tight seal with the valve body. Axial displacement of the poppet head within the chamber, in response to the axial movement of the piston, is provided by the a rolling movement of the sleeve in an axial direction between a piston wall surface and a concentric wall surface within the valve body.

Rolling diaphragm poppets and fluid handling apparatus of this invention: (1) provide long poppet stroke length using a relatively small diameter poppet, thereby enable the compact sizing of fluid handling apparatus; (2) reduce the number of leak paths through the fluid handling apparatus and/or to the environment due to the one-piece poppet, thereby reducing the possibility of corrosive or caustic chemical leakage that can be hazardous to the environment and/or present a health hazard to nearby operators; (3) reduce or even eliminate the generation of particulate matter due to degradation of the movable diaphragm member, due to the rolling construction of the poppet sleeve and for using fluoropolymeric materials in high-purity and aggressive chemical process liquid services; and (4) enable operation at higher process flow rates, fluid temperatures and pressures than otherwise possible using conventional diaphragm-type valves of equal capability.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Valve apparatus constructed in accordance with the practice of this invention comprise a rolling diaphragm poppet that is attached to an actuating piston. The rolling diaphragm poppet provides axial poppet displacement within the valve by an axially directed rolling movement of the poppet, rather than by a diaphragm deformation movement, that allows such valve apparatus to be constructed having a compact size while at the same time both having a longer poppet stroke length and being capable of operating at higher process fluid flow rates and pressures than conventional diaphragm-type valves having the same size.

Figure 1:
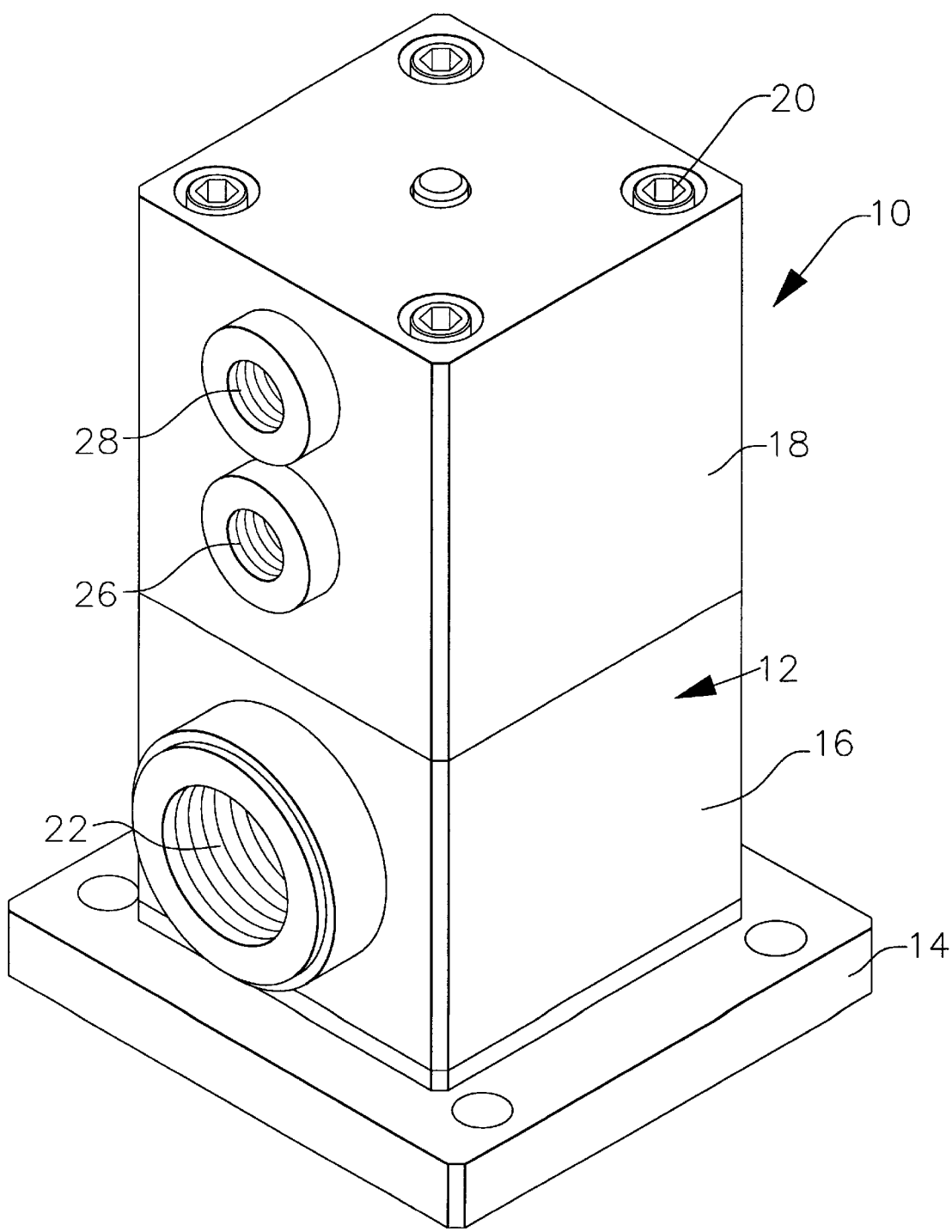
FIG. 1 is a perspective side view of a first embodiment of a valve apparatus provided in accordance with practice of the present invention.

Referring to FIG. 1, a first embodiment valve apparatus 10 provided in accordance with practice of the present invention comprises a valve body 12 made up of, moving from the bottom of FIG. 1 upwardly, a base 14, a fluid transport housing (FTH) 16 disposed on top of the base 14, and a piston housing 18 disposed on top of the FTH 16. Screws 20, or other suitable attachment means, extend through the piston body 18 and the FTH 16, and are threaded into the base 14 to attach the piston body and FTH 16 thereto.

Figure 2:
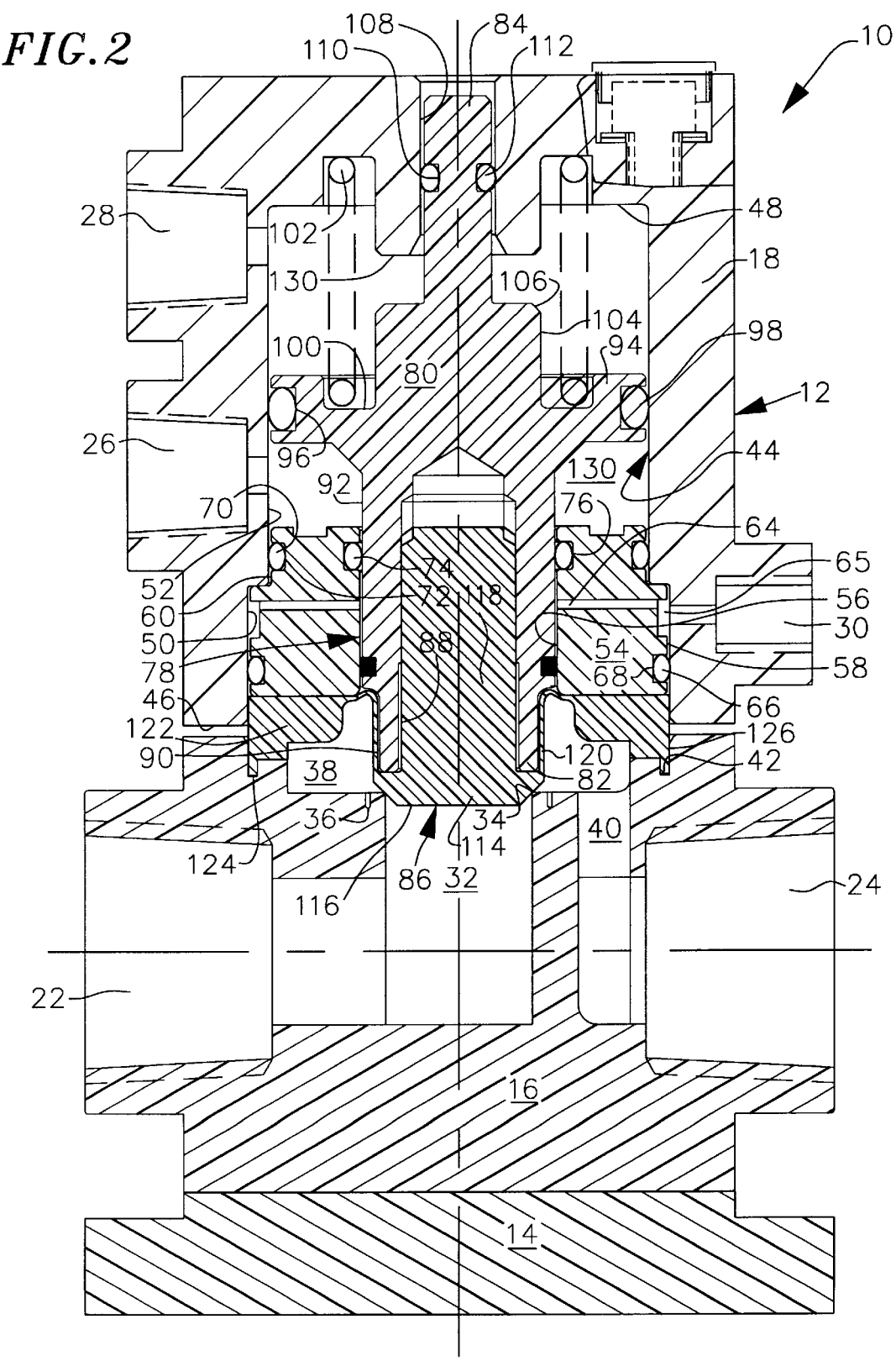
FIG. 2 is a cross-sectional side view of the valve apparatus of FIG. 1 in a closed operating condition for controlling the flow of fluid therethrough.

The FTH 16 includes a fluid inlet port 22 through one of its sidewalls, and a fluid outlet port 24 (as shown in FIG. 2) through an opposite sidewall. In an air- or pneumatically-actuated embodiment of the valve apparatus 10, the piston housing 18 includes an inlet air port 26 and an air outlet port or vent 28 extending through its sidewall. The FTH may also be configured having a leak detection port 30 (as shown in FIG. 2) extending through one of its sidewalls to monitor the occurrence of any fluid leakage within the valve apparatus.

As illustrated in FIG. 2 and discussed in greater detail below, a poppet assembly 78 is disposed within the piston housing 18 and includes a rolling diaphragm poppet 86 at one of its ends. The poppet 86 is designed to both interact with a valve seat within the FTH 16, to control fluid flow therethrough upon actuation of the poppet assembly, and to provide a leak-tight seal with the FTH 16 to prevent the leakage of fluid to either the outside environment or the piston housing 18. The use of the rolling diaphragm poppet, to control fluid flow through the valve, permits a compact valve construction that has a relatively long poppet stroke length and that is capable of handling higher process fluid flow rates and pressures than conventional diaphragm-type valves of equal size.

The valve apparatus embodiment described and illustrated in FIGS. 1 and 2 is designed having a pneumatically actuated poppet assembly. It is to be understood that the design of the valve apparatus may be changed, while not varying from the spirit of the invention, to accommodate other means of poppet assembly actuation, e.g., mechanical, solenoid, hydraulic actuating means and the like.

Referring to FIG. 2, the FTH 16 includes a fluid inlet passage 32 that extends from the fluid inlet port 22 axially upward through the FTH. A valve seat 34 extends circumferentially around an end of the fluid inlet passage 32. A groove 36 is disposed within the FTH concentrically around the valve seat 34 and is designed to allow the valve seat 34 to move radially outward to comply with the poppet when it is placed into contact therewith. Extending upwardly away from the valve seat 34 towards an end of the FTH facing the piston housing 18, the FTH 16 includes a fluid chamber 38 that is designed to route fluid past the valve seat 34 to a fluid outlet passage 40 and out of the FTH via the fluid outlet port 24. The FTH includes a groove 42 within the fluid chamber 38 that is disposed circumferentially around a peripheral edge of the chamber. The groove 42 is designed to accommodate a complementary tongue of a poppet, as will be described in better detail below, to provide a leak-tight seal therebetween.

Attached to an end of the FTH 16 is the piston housing 18. The piston housing includes a piston chamber 44 that extends axially through the piston housing from an open end 46, that interfaces with the FTH, to an opposite closed end 48 of the piston housing. As mentioned above, the piston housing includes, when adapted to provide pneumatically-actuated poppet assembly movement, an inlet air port 26 and an outlet air port 28 that each extend through a piston housing sidewall. Additionally, the piston housing can be configured to provide leak detection via a leak detection port 30 extending through its sidewall.

The piston chamber 44, in a preferred embodiment, has a circular radial cross section and includes both a first diameter section 50, that extends axially a distance from the open end 46, and a smaller second diameter section 52 that extends axially from the first diameter section 50 to the closed end 48 of the piston housing. The piston chamber 44 is constructed in this manner to accommodate non-movable or immobile placement of a piston gland 54 therein. The piston gland is used in applications where an air-actuated poppet assembly is desired to create an air-tight pressurizing chamber within the piston chamber. The piston gland 54 has a donut-shaped annular construction with a central opening 56 extending axially therethrough for accommodating placement of a poppet assembly piston 80 therein. The gland 54 includes an outside wall surface having a first diameter section 58 that is sized for placement within the first diameter section 50 of the piston chamber, and a second diameter section 60 that is sized for placement within the second diameter section 52 of the piston chamber. When loaded into the open end 46 of the piston chamber 44, maximum axial placement of the gland therein is limited by the interaction between complementary shoulders formed in the piston chamber and the gland where the respective chamber and gland first and second diameter sections meet. The gland 54 is sized axially so that, when loaded into the piston chamber, it does not extend beyond the open end 46.

In applications where leak detection is desired, the gland 54 includes a leak passage 64 extending radially therethrough from the central opening 56 to its first diameter section 58.

When loaded within the piston chamber, the leak passage 64 is in fluid flow communication with an annular groove in the first diameter section 58, which groove is in fluid flow communication with the leak port 30 in the piston housing to facilitate fluid-flow into the leak port in the event that process fluid leaks past the fluid chamber 38 and into the piston chamber. Leak detection using a valve configured in this manner can be performed by using conventional leak detection means, such as by invasive and non-invasive leak sensors, or by visual indication.

The piston gland 54 includes one or more annular seals around its outside diameter surface to form a leak-tight seal with the adjacent piston chamber wall surface. In a preferred embodiment, the gland includes a first annular seal 66, that extends circumferentially around its first diameter section 58 and that is disposed within a groove 68, and a second annular seal 70 that extends circumferentially around its second diameter section 60 and that is disposed within a groove 72. The first and second annular seals 66 and 70 are positioned axially along the gland so that the leak passage 64 is interposed therebetween. The gland also includes a third annular seal 74 that extends circumferentially around the surface of the central opening 56 within a groove 76. The third annular seal 74 is positioned axially along the gland on the same side of the leak passage 64 as the second annular seal 70 to both prevent the passage of fluid leaking from the fluid chamber 38 beyond the gland and into the piston chamber, and to direct leaking fluid into the leak passage 64 for leak detection. The third annular seal 74 also forms an air-tight seal against the piston to provide air actuated piston movement. The first, second and third annular seals are preferably O-ring type seals formed from a material having desired properties of elasticity. Where chemical resistance is also desired, the O-ring seal may be made from Viton or from other types of fluoroelastomeric materials.

The poppet assembly 78 is disposed axially within the piston chamber 44. The poppet assembly 78 comprises a piston 80, having a head portion 82 at one of its axial ends, a tail portion 84 at its opposite axial end, and a rolling diaphragm poppet 86 attached to its head portion. The piston 80 is generally cylindrical in shape and includes a hollow passage 88 that extends a distance axially from the head portion 82 into the piston. The hollow passage 88 is configured to accommodate therein and provide attachment with a stem portion 118 of the poppet 86. The outside surface of the piston 80 has a first diameter 90 that extends axially a distance from the head portion, and a second diameter section 92 that is slightly larger than the first diameter section and that extends axially a distance therefrom. The second diameter section 92 of the piston 80 is sized to fit within the central opening 56 of the piston gland 54 so that a leak-tight seal is formed between the piston and the third annular seal 74. The reason why the piston first diameter section 90 is sized smaller than the piston second diameter section 92 will be explained below with reference to the poppet.

The piston 80 includes a flared section 94 that extends radially away from the second diameter section 92, and that has an outside diameter sized to fit within the piston chamber 44 second diameter section 52. The flared section 94 is positioned axially near the middle of the piston and includes a groove 96 disposed circumferentially around its outside surface that is positioned facing a wall surface of the piston chamber. An annular seal 98 is disposed within the groove and provides a leak-tight seal between the piston and the piston chamber. The annular seal 98 can be made from the same type of material described above for the first, second and third annular seals. A backside surface 100 of the flared section 94, i.e., the surface of the flared section directed axially toward the tail portion 84 of the piston, is adapted to accommodate placement of one end of a valve spring 102 thereon.

Moving axially away from the flared section 94 towards the tail portion 84, the piston includes a third diameter section 104 that extends axially a distance from the flared section 94 to the tail portion 84. The third diameter section 104 is sized to fit within the coils of the valve spring 102 to prevent binding with the spring when the poppet assembly is actuated. In a preferred embodiment, the piston third diameter section 102 is sized slightly smaller than the second diameter section 92. The tail portion 84 of the piston 80 extends axially a distance away from the third diameter section 104 to form an end of the piston. The tail portion 84 has a diameter sized smaller than that of the third diameter section 104, thereby forming a shoulder 106 at the transition point.

The piston 80 is loaded into the piston chamber 44 so that the tail portion 84 is disposed within an opening 108 through the closed end 48 of the piston housing 18. The tail portion includes a groove 110 that extends circumferentially around its outside surface, and an annular seal 112 that is disposed within the groove 110 to provide a leak-tight seal between the piston tail and the opening 108. The valve spring 102 is interposed between the closed end 48 of the piston housing 18 and the backside surface 100 of the piston flared section 94, and concentrically around both the third diameter section 104 and a portion of the piston tail portion 84. The poppet gland 54 is disposed around the piston so that a leak-tight seal is formed between the gland central opening 56 and the piston second diameter section 92.

Figure 3:
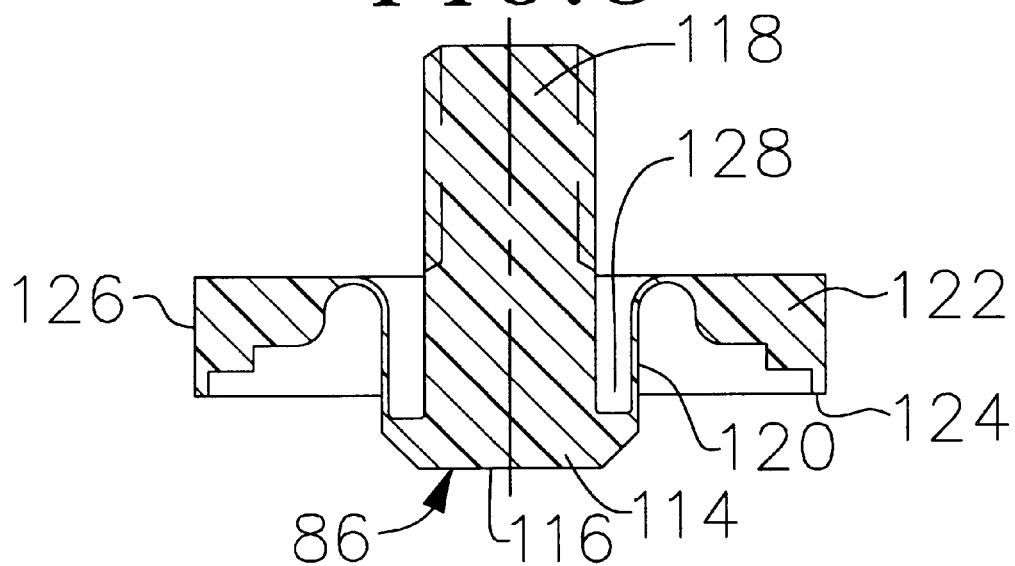
FIG. 3 is a cross-sectional side view of a first embodiment rolling diaphragm poppet from the valve apparatus of FIG. 2.

Referring to FIGS. 2 and 3, the poppet 86 is in the form of a rolling diaphragm and, therefore may be referred to as a rolling diaphragm poppet. The poppet comprises a head 114 that is centrally positioned and that includes an frontside surface 116 that is adapted to contact the valve seat 34 and provide a leak-tight seal therebetween. The poppet head 144 can be configured having a planar frontside surface 116 or can be configured having a non-planar frontside surface. For example, as illustrated in FIGS. 2 and 3, the poppet head can be configured having an edge that is chamfered radially inward. In such example embodiment the poppet head edge can be chamfered inwardly at an angle of approximately 45 degrees.

Figure 4:
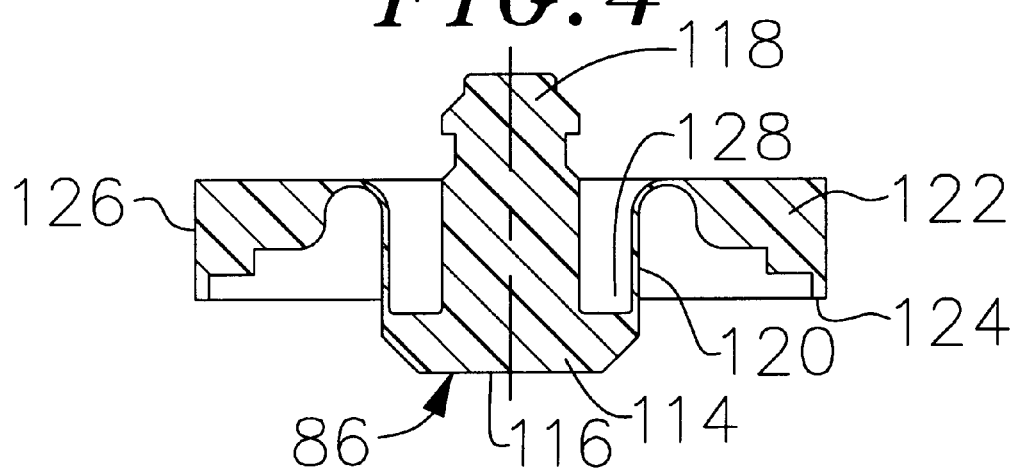
FIG. 4 is a cross-sectional side view of a second embodiment rolling diaphragm poppet from the valve apparatus of FIG. 2.

A poppet stem 118 projects axially away from a backside surface of the head 114 and is adapted to provide an attachment fitting with the hollow passage 88 of the piston head portion 82. In one embodiment, the poppet stem 118 is threaded to provide a threaded attachment with complementary threads within the hollow passage 88 of the piston head portion 82. Alternatively, the poppet stem 118 can be configured to provide an interference snap fit or the like with a complementary hollow passage of the piston head portion to provide attachment thereto. Referring to FIG. 4, for example, the poppet 86 can be configured having an arrow-shaped stem 118 that can snap into a hollow passage 88 of the piston head portion 82 having a complementary shape.

If desired, for purposes of forming a piston having enhanced structural rigidity in the axial direction, the piston hollow passage 88 can be configured having a depth greater than the poppet stem 118 to accommodate placement of a piston insert (not shown) therein. The piston insert can be made from an inert material, such as a ceramic material and the like, that is capable of providing structural reinforcement to the piston. An example of when use of the piston insert would be desirable is where the valve apparatus is to be used in a high temperature or high pressure process fluid application, i.e., where enhanced piston rigidity would be desired.

Moving radially away from the head 114, the poppet includes a sleeve 120 that is integral with the poppet head 114 and that extends a distance axially away from the head to a poppet flange 122. An important feature of rolling diaphragm poppets of this invention is that they are formed as a one-piece construction. Such a one-piece poppet construction is highly desirable because it minimizes the number of potential leak paths through the valve, thereby minimizing the potential for fluid leakage from the transport chamber 38 into the piston chamber 44. Conventional diaphragm-type valves typically include a valve stem that is placed through a hole or opening in the diaphragm. Such multi-piece construction provides an inherent leak path between the valve stem and the diaphragm through which process fluid can exit the valve. The one-piece construction of rolling diaphragm poppets of this invention eliminates this leak path, thereby reducing the possibility of unwanted fluid leakage through or from the valve.

The sleeve 120 is in the form of a continuous thin-wall structure that extends between the head 114 and the flange 122, and that permits the head to be displaced axially relative to the stationary flange 122 via a rolling and unrolling movement of the sleeve in an axial direction. It is important to note that the sleeve has a non-bellowed configuration. Preferably, the sleeve is configured having a cylindrical or conical axial profile, i.e., having a constant or tapered diameter. It is also desired that the sleeve have a constant wall thickness. The sleeve facilitates axial poppet head movement by axially directed rolling movement not by an accordion type stacking movement that can be provided by a bellow-shaped sleeve. A key feature of this design, as will be discussed below, is that the sleeve is at all times supported along its inside surface by the piston and piston gland central opening, respectively. This design is superior to conventional valve designs that incorporate an unsupported diaphragm that provides poppet movement by elastic deformation, because there is no unsupported deformation of the movable member and, thus no risk of rupture or other failure due to such unsupported deformation. Such supported rolling action of the sleeve enables the poppet to function at higher process fluid temperatures and pressures than conventional diaphragm-type valves.

Referring again to FIGS. 2 and 3, the flange 122 has an axial thickness that is greater than the sleeve 120 for purposes of providing an attachment structure between the FTH 16 and the piston housing 18 and, more specifically, between the FTH and the piston gland 54 for an air actuated valve embodiment. The flange 122 has a frontside surface that includes a tongue 124 that is sized to fit within the groove 42 in the fluid chamber 38. Preferably, the tongue 124 has a stepped configuration to stabilize the placement of the flange 122 onto the FTH 16 when the poppet 86 is sandwiched between the piston housing 18 and FTH 16. The flange 122 has a planar outside diameter surface 126 that extends axially from the tongue 124 to a backside surface of the flange, and that has a diameter sized to fit within both the FTH and the piston housing first diameter section 50. A key feature of the poppet flange is that the tongue 124 is sized having a radial width and axial length that completely fills the groove 42 in the fluid chamber 38 to thereby both eliminate any fluid hold-up volume within the FTH, and to provide a leak-tight seal therebetween.

The backside surface of the poppet flange 122 is planar to provide a complementary surface for interfacing with the piston gland 54, in the case of an air-actuated valve embodiment, or the piston housing. A circular cavity 128 extends around the backside surface of the head 114 between the stem 118 and the sleeve 120 that both isolates the sleeve from the stem and that accommodates placement of the piston head portion 82 therein. As shown in FIG. 2, the piston head portion 82 fits within and completely fills the cavity 128 when the poppet stem 118 is placed into and attached with the piston hollow passage 88.

In an example embodiment, such as that illustrated in FIGS. 2 and 3, a poppet 86 constructed to fit within a valve apparatus having a height of approximately 177 millimeters (as measured from the bottom of the base to the top of the piston housing) and a width of approximately 60 millimeters (as measured from the ends fluid inlet and outlet ports) has a flange 122 diameter of approximately 33 millimeters, a radial flange width of approximately 7 millimeters, an axial flange length of approximately 6 millimeters, a head diameter of approximately 14 millimeters, a sleeve 120 wall thickness of approximately 0.4 millimeters, a sleeve length of approximately 6 millimeters, a stem diameter of approximately 9 millimeters, and a stem 118 length of approximately 20 millimeters, and a radial cavity 128 width of approximately 2 millimeters.

The poppet 86 is attached to the piston 80 after the piston and valve spring 102 are loaded into the piston housing 18, and after the piston gland 54 is disposed over the piston and is positioned into the piston chamber 44. The piston housing 18, comprising the poppet assembly 78, is then mounted onto the FTH 16 so that the poppet tongue 124 fits into the fluid chamber groove 42. The poppet assembly 78, as illustrated in FIG. 2, is in the closed position with the head 114 of the poppet 86 disposed against the valve seat 34, preventing fluid within the fluid inlet passage 32 from entering the fluid chamber 38. The poppet assembly is maintained in such closed position due to the spring pressure acting thereon provided by the valve spring 102, i.e., the valve apparatus is constructed to provide normally-closed operation. Alternatively, the valve can be constructed with the valve spring 102 interposed between a frontside surface of the piston flared section and a backside surface of the gland 54 to provide a normally-opened operation.

When the poppet assembly is in the closed position, the poppet sleeve 120 is extended axially into the fluid chamber 38, and a wall surface of the piston head portion 82 supports an inside surface of the sleeve 120. The design of the head portion 82, to support the inside surface of the sleeve 120 when the poppet 86 is in the closed position, is a key design feature because it prevents the relatively thin sleeve from being deformed due to high process fluid operating pressures and/or temperatures.

Figure 5:
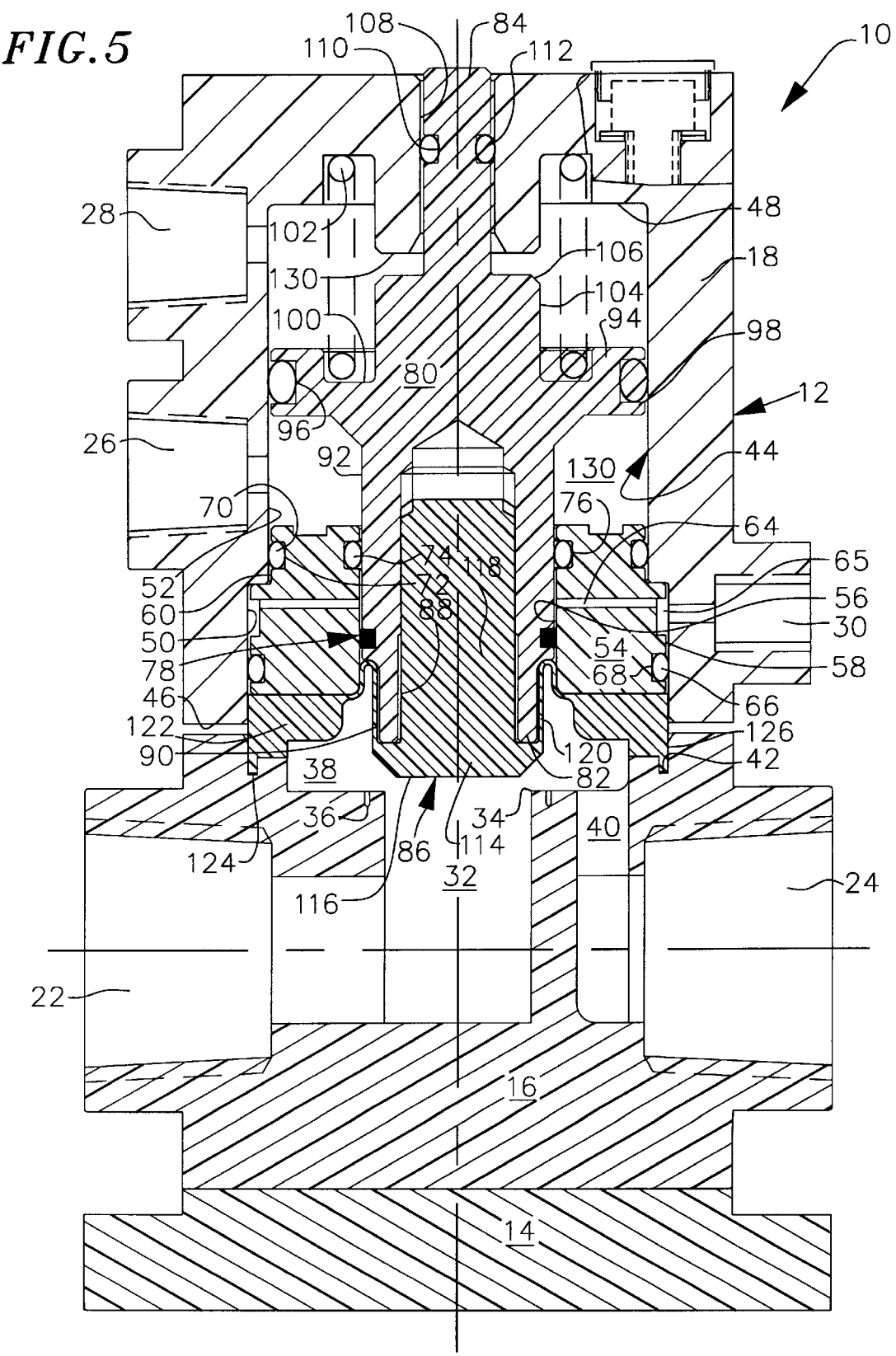
FIG. 5 is a cross-sectional side view of the valve apparatus of FIGS. 1 and 2, illustrating a poppet assembly in an open position.

As illustrated in FIG. 5, when a sufficient amount of pneumatic pressure is routed to an air chamber 130 in the piston chamber between the piston flared section 94 and piston gland 54, via the inlet air port 26, to equalize and overcome the spring pressure provided by the valve spring 102, the piston 80 is displaced axially within the piston chamber 44 towards the closed end 48. The piston 80 is axially displaced within the piston chamber 44 until the piston shoulder 106 abuts against a ridge 130 that projects axially a distance from the piston housing closed end 48 towards the piston. As the piston moves axially within the piston chamber, air within the piston chamber that exists between the piston flared section 94 and the piston housing closed end 48 is displaced or vented therefrom via the air outlet port 28.

The axial displacement of the piston 80 within the piston chamber causes the poppet head 114 to disengage the valve seat 34, thereby allowing fluid within the fluid inlet passage 32 to enter the fluid chamber 38 and pass through the FTH via the fluid outlet passage 40 the fluid outlet port 24. Axial displacement of the piston 80 within the piston chamber also causes the poppet sleeve 120 to roll in an axial direction off of the piston and onto an adjacent concentric inside surface of the piston gland central opening 56.

To enable such rolling action and transfer of the sleeve between the adjacent valve surfaces, e.g., the piston and the piston gland opening, it is important that a sufficient clearance exists between the surfaces to accommodate a rolling diameter of the sleeve. For example, in a preferred valve apparatus embodiment as illustrated in FIG. 2, the piston first diameter section 90 is sized smaller than the piston gland central opening 56 to provide a clearance therebetween of approximately 1.2 millimeter. Such clearance is sufficient to accommodate rolling of a poppet sleeve having a wall thickness of approximately 0.4 millimeters.

As mentioned above, key features of this invention is the design of the rolling diaphragm poppet that: (1) has a one-piece construction; (2) provides a leak-tight seal against the valve seat; (3) provides leak-tight seal with the FTH 16; and (4) permits a relatively long poppet stroke length by rolling axial movement without risking rupture or other type of deformation-related failure. Another desired feature of the poppet is that, due to both its design and material of construction, its use avoids the generation of particulate matter caused from the degradation of the movable portion (i.e., the sleeve), An important feature of the rolling diaphragm poppet is its ability to permit a relatively long poppet stroke length within the fluid chamber while having a relatively small poppet diameter. Conventional diaphragm-type valves require that a larger diameter diaphragm be used in order to achieve an increased poppet or valve stem stroke length. This is so due to the need to control the amount of diaphragm deformation during valve stem actuation to minimize the possibility of diaphragm rupture. Since the poppet of this invention allows poppet movement by an axially directed rolling of the sleeve, rather than by diaphragm deformation, it can be adapted to accommodate a long stroke length by varying the axial length of the poppet sleeve without increasing the poppet diameter. This design feature allows valves incorporating such poppet to be constructed having a more compact size than otherwise possible using conventional diaphragm technology.

It is to be understood that poppets of this invention can be used in fluid flow control valves designed differently than that specifically described above and illustrated in FIGS. 1 and 2, and that such flow control valve embodiment was provided for purposes of reference. For example, poppets of this invention may be used in fluid flow control valves that are manually actuated or actuated by solenoid operation. In such embodiments, the piston housing may be designed differently that illustrated in FIG. 2. For example, in such non air-actuated embodiments the piston chamber does not include the piston gland (since there would be no need to create or have an air chamber), and the piston may not have the flared section (since there would be no need to create or have an air-tight seal within the piston chamber). In such embodiment, the piston chamber would: (1) have an inside diameter sized slightly larger than the piston to accommodate its placement therein; (2) provide support for the poppet sleeve when the poppet is moved into the open position; and (3) abut against the backside surface of the poppet flange.

Poppets constructed according to this invention can also be used in fluid handling apparatus other than valves. For example, rolling diaphragm poppets according to this invention can be configured to serve as a pressurizing member in a reciprocating pump. In such embodiment, the poppet would be attached to a reciprocating piston and would reciprocate within a pressure chamber valved to provide a sequenced fluid inlet into and fluid outlet out of the chamber synchronized with the reciprocating poppet axial displacement within the chamber.

Figure 6:
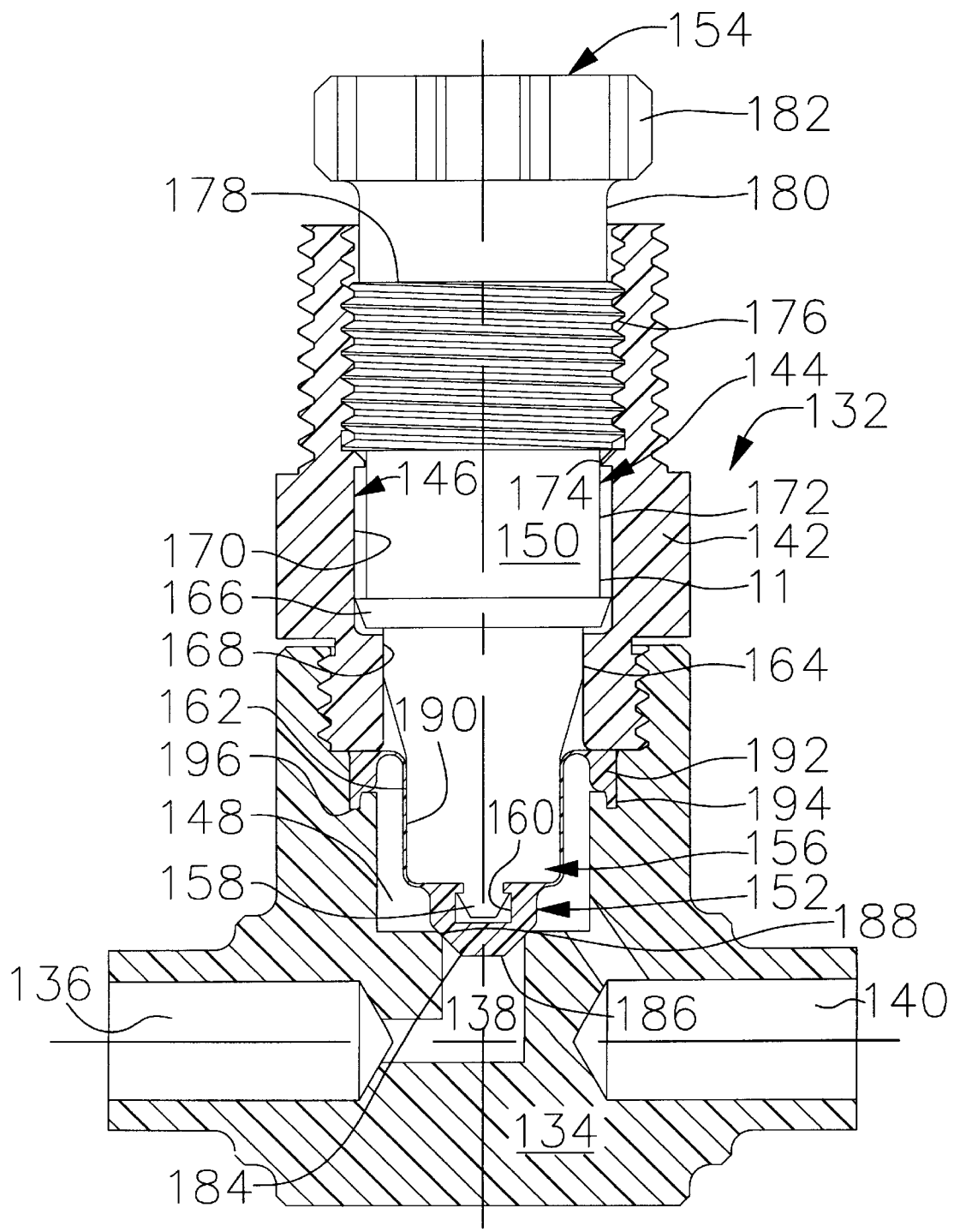
FIG. 6 is a cross-sectional side view of second embodiment of a valve apparatus provided in accordance with practice of the present invention.

Poppets of this invention may be used in the construction of needle or plug valves that are designed to provide precise control over fluid delivery. FIG. 6 illustrates a second embodiment valve apparatus in the form of a plug valve 132, constructed according to principles of this invention, comprising a FTH 134 having a fluid inlet port 136, a fluid inlet passage 138, and a fluid outlet port 140 disposed therethrough. A piston housing 142 is disposed on top of the FTH 134 and is threadably attached thereto. A poppet assembly 144 is disposed axially within a piston chamber 146 of the piston housing 142 and a fluid chamber 148 of the FTH, and comprises a piston 150 and a rolling diaphragm poppet 152.

The piston 150 has a tail portion 154 at one of its axial ends and a head portion 156 at its opposite axial end. The head portion 156 includes a projection 158 that extends a distance axially therefrom. The projection 158 is configured to cooperate with a complementary cavity 160 in a backside surface of the poppet 152 to provide attachment therewith. The head portion 156 has a first diameter section 162 that extends axially a distance along the piston 150. A second diameter section 164, that is larger than the first diameter section, extends axially along the piston 150 from the first diameter section 162 to a radially projecting flared section 166. The second diameter section 164 is sized to fit within a first diameter section 168 of the piston chamber 146 to facilitate its axial displacement therein.

The flared section 166 has a diameter sized to fit within a second diameter section 170 of the piston chamber 146 to facilitate its axial displacement therein. The piston 150 includes a third diameter section 172 that extends axially a distance from the flared section 166, and that is both larger in size than the second diameter section 164 and smaller in size than the flared section 166. The second diameter section 170 of the piston chamber includes a ridge 174 that projects circumferentially inwardly therefrom towards the piston, thereby limiting axial travel of the piston flared section 166 to within the second diameter section 170 of the piston chamber.

Moving axially away from its third diameter section 172, the piston includes a threaded section 176 that is sized and configured to complement an adjacent threaded section 178 of the .piston chamber. The piston includes a fourth diameter section 180 that extends axially a distance from the threaded section 176 to the tail portion 154, and that is sized having the same diameter as its third diameter section 172. The tail portion 154 of the piston includes radially projecting knob 182, that has a diameter greater than the threaded portion 178 of piston chamber, to facilitate grasping and rotating the piston between ones fingers.

The rolling diaphragm poppet 152 is attached to the head portion 156 of the piston and includes a head 184 that has a frontside surface 186 adapted to make contact with a valve seat 188 of the FTH fluid chamber 148 when the poppet is placed into a closed position within the FTH fluid chamber (as illustrated in FIG. 5). As described above and illustrated in FIGS. 2, 3 and 4, moving radially away from the head 186, the poppet includes a sleeve 190 that extends axially away from the head to a flange 192. The sleeve 190 is designed having a thin-wall construction to permit it to roll in an axial direction onto either an adjacent concentric first diameter section 162 of the piston, when the poppet is in a closed position within the FTH, or onto an adjacent first diameter section 168 of the piston chamber 146, when the poppet is in an open position within the FTH.

The poppet flange 192 is constructed identically to that described above and illustrated in FIGS. 2 to 4. The FTH fluid chamber 148 includes a groove 194 that is disposed circumferentially therearound to accommodate placement of the flange tongue 196 therein. The tongue 196 and flange 194 are sized as described above to eliminate fluid hold up therein, and to provide a leak-tight seal when the flange 192 is interposed between the FTH and piston housing.

The plug valve 132 is assembled by installing the piston 150 into the piston chamber so that the piston flared section 166 passes over the piston chamber ridge 174 and into the piston chamber second diameter section 170. The poppet 152 is positioned over the piston head portion 156 and the projection 158 is inserted and snapped into the cavity 160 disposed within the backside of the poppet head 184. The poppet flange 192 is placed into the FTH fluid chamber 148 so that its tongue 196 is installed within the fluid transport chamber groove 194, and the piston housing/piston assembly is attached to the FTH by threaded engagement between the piston housing and FTH.

The poppet sleeve 190 permits axial displacement of the poppet within the fluid chamber by rolling in an axial direction along both the piston and piston chamber. Both the piston and piston chamber provide support to the inside surface of the sleeve, thereby protecting the sleeve against unwanted deformation. The poppet 152 is moved into a closed position within the FTH fluid chamber 148 by rotating the piston tail portion 154 in a first direction that causes, via the threaded cooperation of the piston and the piston chamber, the piston 150 to move towards the FTH and the poppet head 184 to move into contact with the valve seat 188. The piston is configured to rotate within the poppet by a loose fitting that is formed between the projection 158 of the piston and the cavity 160 of the poppet. The poppet 152 is moved into an open position within the FTH fluid chamber by rotating the piston tail portion 154 in a second direction, opposite from the first, that causes the piston to move away from the FTH and the poppet head 184 to move away from the valve seat 188.

A plug valve constructed as described above and as illustrated in FIG. 6, comprising the rolling diaphragm poppet of this invention, has the same key features as that described above for the valve apparatus illustrated in FIG. 2.

Figure 7:
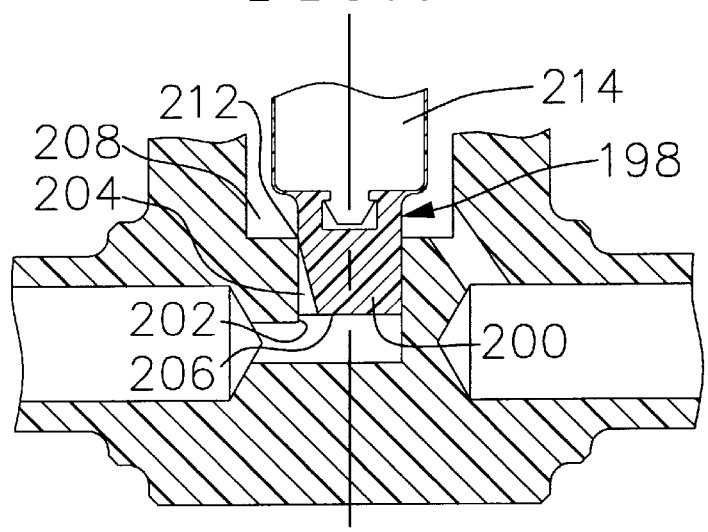
FIG. 7 is a cross-sectional enlarged side view of a portion of a second embodiment valve apparatus comprising a rolling diaphragm poppet configured to provide improved fluid flow rate control characteristics.

FIG. 7 illustrates a second embodiment valve apparatus comprising a rolling diaphragm poppet 198 that is configured to provide a precise control of fluid flow over a determined fluid lfow rate. Specifically, the poppet 198 includes a head 200 that has a generally cylindrical radial cross section and that is sized to provide a low tolerance fit within the fluid inlet passage 202. The low tolerance or interference fit between the poppet head and the fluid inlet passage is a key design feature that stabilizes the poppet within the inlet passage, thereby eliminating lateral poppet movement therein and any fluid flow variations associated with the same.

Figure 8:
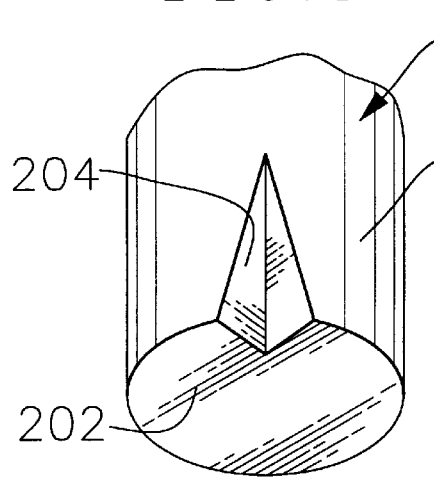
FIG. 8 is a perspective side view of a rolling diaphragm poppet from the second embodiment valve apparatus of FIG. 7.

The poppet head 200 includes a notch 204 that runs axially along the head a distance away from the frontside surface 206 of the head, and that projects radially inward a distance into the head. The notch can have a number of difference geometric configurations. For example, as best shown in FIG. 8, the notch 204 can have a V-shaped configuration, taken from the frontside surface or free end of the head 200, having a gradient depth that goes to zero (i.e., that blends with the cylindrical outside surface of the head) at an axial distance from the frontside surface. Alternatively, the notch can be in the shape of a crescent that is formed by radially slicing away a portion of the poppet head at an angle to the axial axis running therethrough. In each embodiment, such slice would extend axially from a free end of the poppet head a predetermined distance therealong, and would extend radially outwardly from the free end.

Figure 9:
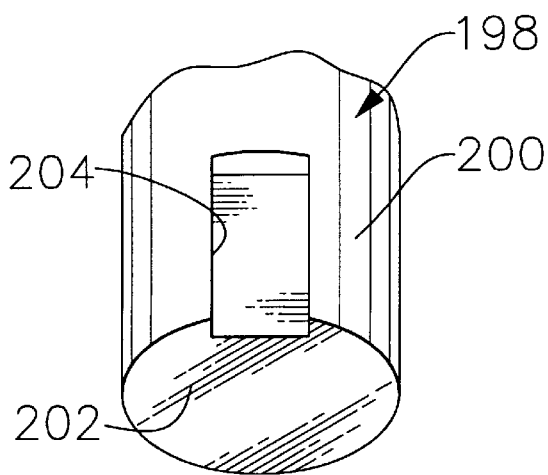
FIG. 9 is a perspective side view of an alternative rolling diaphragm poppet that can be used with the second embodiment valve apparatus of FIG. 7 to provide linear fluid flow rate control characteristics.

The notch can also be configured to provide a valve having linear fluid flow rate characteristics. Linear fluid flow rate as used herein means that the rate of fluid flow through the FTH changes linearly relative to the axial displacement of the poppet within the fluid inlet passage 202. For example, referring to FIG. 9, the notch 204 is configured in the shape of a rectangle to provide linear fluid flow rate characteristics. The notch 204, taken from the frontside surface of the head 200, has a determined width and radial depth, and has a determined axial height that extends along the poppet head an axial distance from the frontside surface. The exact size of the notch, and the number of notches disposed in the poppet head, can vary depending on the fluid flow rate range desired for a particular valve application.

An important feature of the poppet head embodiment that is specifically designed to provide a valve having linear fluid flow rate characteristics, is that it enables enhanced control over fluid flow rates at low fluid flow conditions when compared to conventional needle valves that provide a geometric (i.e., nonlinear) fluid flow rate characteristic. The use of valves that produce such geometric fluid flow rate characteristics may not be desirable in applications where precise flow rate control and flow rate adjustability is desired or necessary over a range of fluid flow rates.

Still referring to FIG. 7, the poppet 198 is positioned within the FTH fluid chamber 208 so that the poppet head 200 is positioned within the fluid inlet passage 202 a sufficient depth so that the notch 204 is disposed completely below the valve seat 212. As the piston 214 is rotated or otherwise moved axially away from the FTH, the poppet head 200 is withdrawn from the fluid inlet passage 202 so that the notch 204 is moved past the valve seat 212, thereby initiating fluid flow past the poppet head 200, into the fluid chamber 208, and through the fluid outlet passage 214.

A key feature that enables the poppet as described above and illustrated in FIGS. 7 to 9 to provide a valve having improved control over its fluid flow rate characteristics is the fixed or non-rotatable attachment of the poppet to the FTH. Such non-rotational axial movement of the poppet head 200 within the fluid inlet passage 202 eliminates undesired flow rate effects or variations that are known to be produced by conventional rotatable flow control members. In conventional needle valves, the flow control member is allowed to rotate within the fluid chamber as it is moved axially therein to adjust the flow of fluid through the valve. The rotation of such flow control member is known to introduce variations in the fluid flow rate characteristic of the valve that impairs the valve's ability to provide precise fluid flow rate control over a range of fluid flow rates. The non-rotatable attachment of the poppet within the FTH eliminates such rotationally induced fluid flow rate characteristic variations.

The interference placement of the poppet head within the fluid inlet passage to stabilize the poppet, and the non-rotatable attachment of the poppet to the FTH, act together to stabilize and control the placement of the poppet within the valve, thereby allowing the valve to provide a greater degree of control over fluid flow rate than previously possible in conventional needle valves. Additionally, even greater control over fluid flow rate is achieved when the valve of this invention comprises a poppet that is configured to provide a linear fluid flow rate characteristic.

Valve apparatus constructed according to principles of this invention are well suited for use in transporting and regulating the flow of all types of fluids. A particular application for such valve apparatus is to control the flow rate of process chemicals that are used, for example, in the semiconductor industry. In such applications, it is desired that the FTH, and poppet, i.e., the wetted valve members, preferably be made from a material that displays good chemical and thermal resistance properties. Such properties are desirable if the valve apparatus is to be used in the semiconductor manufacturing industry or in any other industry where corrosive chemicals are to be passed through the valve or where it is desirable that a high degree of chemical purity of the process chemical passed through the valve be maintained. In the semiconductor manufacturing industry, highly corrosive process chemicals such as strong inorganic acids, strong inorganic bases, strong solvents, and peroxides are used during the etching operation and are oftentimes heated to enhance the etching action of the chemicals, and thus enhance the efficiency of the etching operation. It is, therefore, important that the valve and poppet contained therein to control the flow of such process chemicals be both chemically and thermally resistant to provide dependable operation without the potential for valve failure, which may result in leakage of the corrosive chemicals and associated vapors from the valve, where it could cause a hazard to the to the environment and/or a danger to nearby operators.

Additionally, it is important that the valve be chemically resistant so that it will not degrade upon contact with the process chemicals and introduce contamination into chemically pure process liquids. The introduction of such contaminants may cause hundreds of thousands of dollars of damage to a batch of semiconductors undergoing treatment with such process chemicals.

In such application, it is desired that the FTH and poppet be constructed from a fluoropolymer compound selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is Teflon® PFA or Teflon® PTFE, which are provided by DuPont Company of Wilmington, Del. Such materials are not damaged by corrosive, acidic, or caustic liquids and do not introduce contamination into chemically pure liquids. The non-wetted valve members, e.g., the piston housing and piston, can be made from any suitable structural material. Since these valve members are not wetted by the process fluid they can be made from such plastics as polypropylene and the like that can provide a suitable degree of structural rigidity for the particular application. Where properties of chemical resistance are desired for the entire valve, the non-wetted members can be formed from the same fluoropolymers described above, wherein a preferred chemically resistant material for the piston housing and piston is Tefzel® ETFE from DuPont.

Each of the valve members comprising the FTH, piston housing, piston and poppet, can be formed by either mold or machine process, depending on both the type of material that is chosen and the project budget. For example, in a preferred embodiment the poppet is formed from Teflon® PTFE by a machine process due to the nature of the selected material. Teflon® PTFE is a preferred material for the poppet because of its superior anti-fatigue characteristics. However, the rolling diaphragm poppet can also be made from Teflon® PFA, in which case it would be formed by molding process due to the different characteristics of this material.

Valve apparatus embodied as the fluid flow control valve illustrated in FIGS. 1 and 2 can be used to reliably operate to control the distribution of either fluid or gas through the FTH at temperature conditions of up to about 180° C., and pressure conditions of up to about 150 psig at an ambient temperature of about 25° C. or above.

Accordingly, it is to be understood that, within the scope of the appended claims, valve apparatus and rolling diaphragm poppets constructed according to principles of this invention may be embodied other than as specifically described herein.

What is claimed is:

1. A valve comprising:
    a fluid transport housing having a fluid chamber disposed therein, a fluid inlet and outlet in communication with the fluid chamber, a valve seat positioned within the fluid chamber between the fluid inlet and outlet, and a groove disposed adjacent a fluid housing axial end;
    a piston housing connected with the fluid transport housing and having a piston chamber disposed therein;
    a piston disposed within the piston chamber;
    a poppet attached to an end of the piston and disposed within the fluid chamber, wherein the poppet comprises:
        a poppet body having an imperforate head adapted to interact with the valve seat to control fluid flow therebetween;
        a hollow sleeve that is integral with the poppet head and that extends axially away therefrom forming an annular recess between the sleeve and a poppet body surface for receiving an annular piston section, wherein the sleeve has a thin-wall construction and sufficient axial sleeve length to permit the poppet to be axially displaced within the valve by a rolling movement of the sleeve along a surface of the annular piston section; and
        a flange that is integral with the sleeve and extends radially away from an axial end of the sleeve opposite the poppet head to define a peripheral edge of the poppet, the flange including a tongue that projects axially outwardly from the flange and that is sized having a radial width greater than that of the fluid transport housing tongue to provide an interference fit therewith, wherein the flange is interposed between the fluid transport housing and piston housing to provide a leak-tight seal therebetween;
    means for actuating the piston and poppet axially within the valve.

2. A valve as recited in claim 1 wherein when the poppet is placed in an open position with the valve seat to permit fluid flow through the fluid transport housing, a radially outwardly facing surface of the sleeve is positioned against a wall surface of the valve concentric with the piston.

3. A valve as recited in claim 1 wherein the poppet is a one-piece construction.

4. A valve as recited in claim 3 wherein the poppet is formed from a fluoropolymeric material.

5. A valve as recited in claim 1 wherein the fluid transport housing includes a groove disposed concentrically around the valve seat to allow the valve seat to move radially when the poppet is placed in contact therewith.

6. A valve as recited in claim 1 comprising a leak detection port extending through the piston housing and positioned adjacent a side of the poppet opposite from the valve seat to detect any leakage of fluid past the poppet.

7. A valve as recited in claim 1 wherein the head includes at least one notch disposed radially therein and that extends axially therealong from a free end of the head, and wherein the head is sized to form an interference fit within the valve seat to provide a leak-tight fitting with the head when the head is inserted therein so that such notch is not exposed, and to provide fluid flow across the valve seat when the head is moved axially within the seat so that a portion of the notch is withdrawn from the valve seat.

8. A poppet for use in a fluid transport apparatus comprising:
    a body having an imperforate head having a circular radial cross section;
    a hollow cylindrical sleeve integral with the head and extending axially away from a peripheral edge of the head, wherein the sleeve has a continuous thin-wall construction defining a recess along a poppet body surface for receiving a piston section therein, the sleeve having sufficient axial sleeve length to roll between the piston section and an adjacent concentric valve wall surface to provide axial poppet movement therebetween; and
    a flange that is integral with the sleeve and that extends radially away from an end of the sleeve opposite the head, the flange including a tongue that is sized to provide an interference fit within a groove of the fluid transport apparatus to provide a leak-tight fitting against an adjacent fluid handing apparatus surface.

9. A poppet as recited in claim 8 wherein the sleeve has a continuous inside diameter dimension.

10. A poppet as recited in claim 8 wherein the poppet further comprises:
    means for attaching the poppet to an actuating piston, said means projecting axially away from a backside surface of the head; and
    an annular cavity disposed between the sleeve and the means for attaching for accommodating placement of a piston end therein for supporting an inside surface of the sleeve.

11. A valve apparatus for controlling fluid flow comprising:
    a valve body having a chamber that extends axially therethrough and a groove disposed therein;
    a poppet that is disposed within the chamber and that is attached at one end to a piston that is axially displacable within the chamber, wherein the poppet has a one-piece construction and comprises:
        a poppet body having an imperforate head having a circular radial cross section and having a frontside surface adapted to interface with a valve seat in the chamber to control fluid flow therethrough;
        a hollow cylindrical sleeve extending axially away from a peripheral edge of the head and having a thin-walled, constant-diameter construction, wherein the sleeve defines a recess against a poppet body surface for accommodating a portion of the piston, the sleeve having a sufficient axial length to provide axial poppet movement within the valve by rolling between an outside surface of the piston portion disposed within the recess and an adjacent concentric valve wall surface; and a flange extending radially from the sleeve to define a peripheral edge of the poppet, the flange including a tongue disposed within the valve body groove, wherein the tongue has a radial thickness that is greater than that of the groove to form an interference fit therewith to provide a leak-tight seal with the valve body.

12. A valve apparatus as recited in claim 11 wherein the poppet is formed from a fluoropolymeric material.

13. A valve apparatus as recited in claim 11 wherein poppet head includes at least one notch that is disposed radially therein to a predetermined depth and that runs axially a distance along a length of the head, and wherein at least a portion of the poppet head is disposed within the valve seat.

14. A valve apparatus as recited in claim 13 wherein the notch is in the form of a rectangle that provides linear fluid flow characteristics as the poppet is moved axially within the valve seat.

15. A valve apparatus for controlling the rate of fluid flow therethrough comprising:

a valve body having a chamber extending axially therein and a valve seat disposed within the chamber;

a piston disposed axially within the valve body;

means for moving the piston in an axial direction within the chamber; and a one-piece poppet attached to an end of the piston and mounted to the valve body comprising:

a flange defining a peripheral edge of the poppet and having a circular radial cross section, the flange including a tongue extending axially therefrom that is disposed within a groove in the valve body, the tongue being sized to form an interference fit with the groove to form leak-tight seal therewith;

a hollow sleeve extending axially away from an inside diameter of the flange, wherein the sleeve has a thin-wall construction and a continuous diameter, and wherein an inside diameter of the sleeve is positioned against a wall surface of the piston; and an imperforate head extending radially inwardly from the sleeve, the head having an outside surface that forms a leak-tight seal with the valve seat, wherein the piston is attached to the poppet at a backside surface of the head;

wherein the sleeve has an axial length that permits axial poppet movement within the chamber by rolling in an axial direction between the piston wall surface and a concentric wall surface of the valve body to control fluid flow through the valve apparatus.

16. A valve apparatus as recited in claim 15 wherein the valve body further includes a groove that is disposed within the valve body concentrically around the valve seat to permit radial movement of the valve seat when placed into contact with the head of the poppet.

17. A valve apparatus as recited in claim 16 wherein the means for moving the piston in the chamber is air pressure and wherein the valve body further includes:

an annular piston gland disposed within the chamber having an outside diameter that forms a leak-tight interface with a wall surface of the chamber, and a piston opening extending axially therethrough for accommodating placement of the piston therein and forming a leak-tight interface therewith; and wherein the piston further includes a flared section that extends radially therefrom to form a leak-tight interface with a wall surface of the chamber, wherein together the piston gland and piston flared section form an air chamber within the valve body chamber to provide axial displacement of the piston valve chamber by air pressure.

18. A valve apparatus as recited in claim 17 wherein the means for moving the piston in the chamber further comprises a spring disposed axially within the chamber between the valve body and an end of the piston opposite from the poppet.

19. A valve apparatus as recited in claim 16 wherein the head has a substantially cylindrical radial cross section and includes at least one notch that is disposed radially therein, the notch having a predetermined depth and extending axially along the head from a free end of the head, and wherein the head is inserted within the valve seat and fluid flow through the valve is regulated by the amount that the notch extends from the valve seat.

20. A valve apparatus as recited in claim 16 wherein the valve body includes a leak detection port extending from the valve chamber through a wall of the valve body, wherein the leak detection port is positioned axially within the valve body adjacent a side of the poppet opposite from a valve seat of the valve body.

21. A method for controlling fluid flow through a fluid handling apparatus comprising an axially movable poppet disposed therein, the poppet having a head portion that interacts with a poppet seat disposed within an apparatus fluid chamber, a sleeve extending axially away from the head forming an annular recess for receiving an annular piston section, the sleeve having a thin-wall construction, the poppet further including a flange defining a sleeve end opposite from the head that forms a leak-tight attachment with the chamber, the method comprising step of moving the poppet axially within the fluid handing apparatus to cause the poppet head to interface with the poppet seat by rolling the poppet sleeve between a surface of the piston section and a concentric opposed wall surface.

22. A method as recited in claim 21 further comprising the step of axially moving the poppet head across the valve seat to provide linear fluid flow rate control, wherein the poppet head is inserted a depth within the valve seat and includes at least one notch that is disposed radially therein.

23. A valve comprising:

a fluid transport housing having a fluid chamber disposed therein, a fluid inlet and outlet in communication with the fluid chamber, a valve seat positioned within the fluid chamber between the fluid inlet and outlet, and a groove disposed adjacent a fluid housing axial end;

a piston housing connected to the fluid transport housing axial end and having a piston chamber disposed therein;

a piston disposed within the piston chamber a poppet formed from a fluoropolymeric material attached to an axial end of the piston and disposed within the fluid chamber, wherein the poppet comprises:

a body having an imperforate head positioned opposite the valve seat to control fluid flow through the valve when the head and seat are placed into contact with one another;

a hollow sleeve that is integral with the poppet head and that extends axially away therefrom, wherein the sleeve has a thin-wall construction defining an annular recess against the poppet body for receiving a portion of the piston therein, wherein the sleeve has an axial length that permits the poppet to be axially displaced within the valve by action of the sleeve rolling along a piston outside surface disposed within the recess and along an opposed concentric wall surface; and a flange that is integral with the sleeve and extends radially away from an axial end of the sleeve opposite the poppet head to define a peripheral edge of the poppet, the flange including a tongue that projects axially therefrom that is sized having a radial width greater than that of the fluid transport housing tongue to provide an interference fit therewith, wherein the flange is interposed between the fluid transport housing and piston housing to provide a leak-tight seal therebetween;

means for actuating the piston and poppet axially within the valve; and a leak detection port extending through a wall surface of the piston housing and in fluid flow communication with a backside surface of the poppet that is opposite the valve seat;

wherein fluid is prevented from flowing through the valve when the poppet head is positioned against the valve seat and the sleeve inside surface is positioned against the piston, and wherein fluid is permitted to flow through the valve when the poppet head is free from the valve seat and at least a portion of the sleeve outside surface is positioned against a valve wall surface.

* * * * *